March 7, 1939.                B. W. JONES                2,149,998
                              TRAFFIC DETECTOR
                            Filed March 19, 1937

Inventor:
Benjamin W. Jones,
by Harry E. Dunham
His Attorney.

Patented Mar. 7, 1939

2,149,998

UNITED STATES PATENT OFFICE 2,149,998

TRAFFIC DETECTOR

Benjamin W. Jones, Schenectady, N. Y., assignor to General Electric Company, a corporation of New York Application March 19, 1937, Serial No. 131,903

1 Claim. (Cl. 200—87)

My invention relates to traffic detectors, more particularly to the type of detectors used in conjunction with vehicle actuated traffic signals.

One object of my invention is to provide a simple and rugged traffic detecting device operable under all weather conditions.

For a better understanding of my invention together with other and further objects thereof, reference is had to the following description taken in connection with the accompanying drawing, and its scope will be pointed out in the appended claim.

In vehicle actuated traffic signals, it is important to obtain an operation of the signals in response to all types of vehicles irrespective of the number of wheels and irrespective of size. It is also important to obtain a response under all weather conditions, and it is important to provide a device which will be able to withstand the continual pounding of vehicles moving over the road surface. In accordance with my invention, I accomplish these results by providing under the road surfaces, a detector responsive to a moving mass of metal and sealed within a container so that it remains unaffected by rain or snow.

Figure 1:
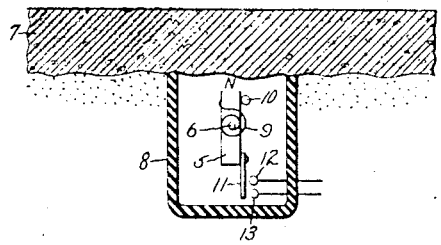
Figure 2:
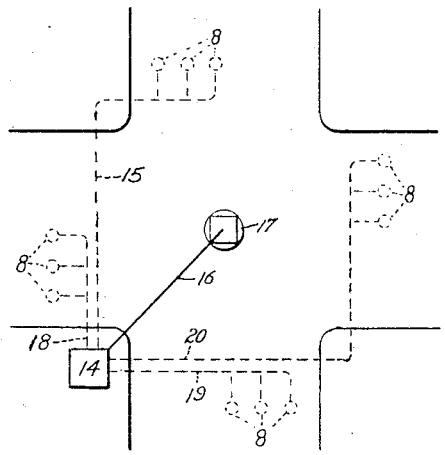

In the accompanying drawing, I have illustrated in Fig. 1 a vehicle detector built in accordance with my invention installed under a road surface, and in Fig. 2, I have indicated the relative location of such detectors at the intersection of two streets and connected to traffic signaling apparatus.

Referring to the drawing in detail, my detector comprises a permanently magnetized metal bar 5 vertically arranged on a pivot 6, the axis of the pivot being at right angles to the normal movement of vehicles upon a road surface 7. The bar magnet is sealed in a waterproof container 8 made of a nonmagnetic substance preferably metal such as copper or aluminum. A spiral spring 9 maintains the bar magnet in a vertical position against a stop member 10, and a contact arm 11 is attached to the lower end of the bar magnet, operable to close a circuit across contacts 12 and 13 when the bar magnet is moved clockwise about its pivot 6.

The bar magnet is preferably made of an alloy of aluminum and iron as described in U. S. Patent No. 1,968,569. This alloy is capable of being magnetized to a greater density than steel, and has the additional property of retaining its magnetization indefinitely. Each bar 5 is therefore surrounded by a powerful magnetic field projecting into the space above the street level. When a vehicle approaches this field, it affords a low resistance path for this magnetic field through its metal parts, and thereby creates an attraction between itself and the bar 5. The bar being mounted upon the pivot 6, tends to move about this pivot into a position of least resistance to the magnetic field which is now substantially confined between itself and the moving vehicle. This position of least resistance is that in which the axis of the bar intersects the approximate magnetic center of the vehicle, whereby the bar tends to rotate about its pivot in accordance with the movement of the vehicle above it.

In order to obtain a proper action of the detector, the bar 5 is provided with the spiral spring 6 which normally holds the bar 5 in a vertical position against the stop 10. The contact arm 11 mounted on the lower end of the bar cooperates with the contacts 12 and 13, comprising the terminals of a circuit leading to a signal controller 14. They are placed in the vicinity of the contact arm, so that they are engaged thereby when the bar is moved counterclockwise. When a vehicle approaches the detector, the bar 5 tends to turn clockwise before the vehicle reaches the detector, but is prevented by the stop 10. As soon as the vehicle passes above the detector, however, the bar 5 rotates against the action of spring 6 in a counterclockwise direction and closes the circuit between contacts 12 and 13 through the contact arm 11, thereby effecting an operation of the controller 14. The advantage of this detector is that it operates independently of the number of wheels on a single vehicle, and independently of its size. The bar alines itself with the approximate center of the vehicle, and moves with it until the vehicle has moved out of the magnetic field. It thereby closes the signal circuit only once for each vehicle, and accordingly sends out only a single impulse. Furthermore, it operates under all weather conditions, its response being constant under all these conditions, and requires only a substantially metallic vehicle for its operation. Another advantage of the detector is that it is inherently more responsive to vehicles traveling in one direction than it is to vehicles traveling in the opposite direction. Referring to Fig. 1, an arrow indicates the direction of movement of a vehicle to which this detector is intended to respond. The stop 10 prevents a rotation of the bar clockwise responsive to any attraction between the vehicle and bar, existing before the vehicle arrives directly above the detector. When the vehicle arrives directly above the detector, the attractive force is at its maximum, and is great enough to overcome the inertia of the bar as well as the torque of the spring 9. This inertia having been overcome, the bar magnet continues to move about its pivot in response to a diminishing force, until the contact arm 11 engages the stationary contacts 12 and 13 to close the circuit to the signalling apparatus.

When a car approaches from the opposite direction, the attraction between it and the bar increases as the vehicle approaches. Before any movement of the bar takes place, however, this force must again become great enough to overcome the pressure of the spring 9 and the inertia of the bar. This occurs when the vehicle is near the detector and since the vehicle is at this instant traveling in a direction opposite to such movement, the bar does not move as far as it moves in response to a vehicle moving in the opposite direction. Furthermore, the attraction between the vehicle and the bar is at this instant increasing so that the effect of the vehicle to cancel any movement of the bar is increasing. Consequently, any movement of the bar that may take place responsive to a vehicle moving in this direction is retarded by the vehicle and the total travel of the bar about its pivot is shorter than it is in response to a vehicle moving in the first direction in which the vehicle tends to increase the total travel of the bar. This difference in response being inherent in the device, it is a matter of simple adjustment to obtain a circuit closing movement in one instance and no movement at all or one that falls short of closing the circuit contacts in the second instance.

In Fig. 2 I have diagrammatically indicated the approximate location and distribution of the receptacles 8 in the lanes of traffic approaching a street intersection. It is practical to arrange a number of these detectors in a lane at right angles to the direction of travel of vehicles and some distance away from the actual intersection. The contacts 12 and 13 of each detector may be connected in parallel with the corresponding contacts in the other detector, so that the operation of either one of the devices will set into motion the traffic signaling controller. In this figure, I have indicated the connection of these contacts in parallel with each other by dotted lines 15 which lead to a common control mechanism indicated by the rectangle 14 from which a cable 16 leads to a traffic signal unit 17 located in the center of the intersection. The receptacles 8 are arranged in four groups, and, therefore, separate conductors 15, 18, 19 and 20 lead into the common control mechanism 14 for controlling the signals 17. The manner of operation of the signals, and the mechanism therefore is not a subject of my present application. Any suitable mechanism such as is disclosed, for example, in U. S. Patent No. 2,050,637, Tone, may be used.

What I claim as new and desire to secure by Letters Patent of the United States is:

In a vehicle detector for a traffic signalling system, the combination of a casing mounted below the road surface, a permanent bar magnet, pivots for supporting said magnet at its center in said casing, means for normally holding said magnet in a vertical position comprising a rigid support for preventing rotation of said magnet about its pivot in one direction, spring means for normally holding said magnet in the vertical position against said rigid support, and a pair of contacts operated to control a circuit responsive to a movement of said magnet about its pivot, whereby upon the passage of vehicles over said detector in one direction, an operating circuit for the traffic signalling system will be affected and whereby upon vehicles traveling over the detector in the other direction, the detector will remain inoperative.

BENJAMIN W. JONES.